(12) United States Patent
Shiozawa et al.

(10) Patent No.: US 12,473,852 B2
(45) Date of Patent: Nov. 18, 2025

(54) CONTROL DEVICE FOR INTERNAL COMBUSTION ENGINE

(71) Applicant: TOYOTA JIDOSHA KABUSHIKI KAISHA, Toyota (JP)

(72) Inventors: Hikaru Shiozawa, Susono (JP); Shingo Korenaga, Nagoya (JP); Takahiro Tsukagoshi, Susono (JP); Takahiko Fujiwara, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/999,582

(22) Filed: Dec. 23, 2024

(65) Prior Publication Data
US 2025/0327415 A1 Oct. 23, 2025

(30) Foreign Application Priority Data
Apr. 17, 2024 (JP) .................... 2024-066749

(51) Int. Cl.
*F01N 9/00* (2006.01)
*F01N 11/00* (2006.01)

(52) U.S. Cl.
CPC .............. *F01N 9/00* (2013.01); *F01N 11/002* (2013.01); *F01N 2900/1631* (2013.01)

(58) Field of Classification Search
CPC ..... F01N 2900/1631; F01N 9/00; F01N 9/002
See application file for complete search history.

(56) References Cited

U.S. PATENT DOCUMENTS

2013/0255236 A1* 10/2013 Ishii ............... F02D 41/405
60/297
2015/0092809 A1* 4/2015 Khaled ............ F01N 11/002
374/4

FOREIGN PATENT DOCUMENTS

| DE | 102020101069 A1 * | 7/2021 | ............ F01N 3/005 |
| JP | 2008-190341 A | 8/2008 | |
| JP | 2015-081541 A | 4/2015 | |
| WO | 2015/060014 A1 | 4/2015 | |

* cited by examiner

*Primary Examiner* — Ngoc T Nguyen
(74) *Attorney, Agent, or Firm* — SoraIP, Inc.

(57) ABSTRACT

A control device for an internal combustion engine is applied to an internal combustion engine mounted on vehicles in which filters for collecting PM are arranged in an exhaust passage. After the internal combustion engine is started, the control device of the internal combustion engine executes a temperature raising process of raising the upstream side exhaust temperature, which is the temperature of the exhaust gas on the upstream side of the filter in the exhaust passage, until the condensed water of the filter reaches a vaporized state.

4 Claims, 6 Drawing Sheets

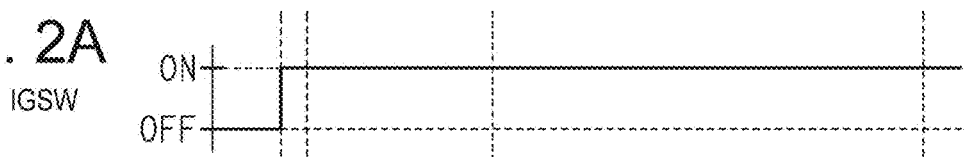
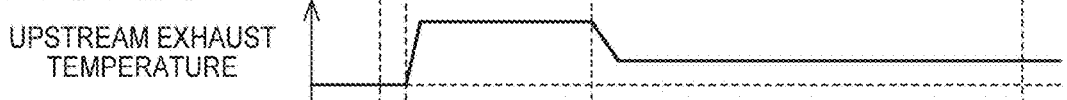
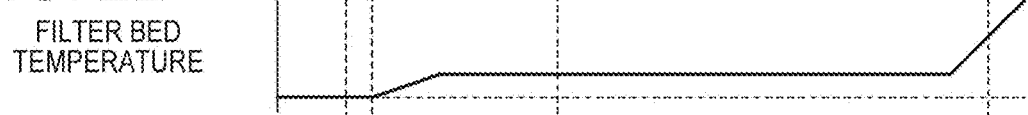
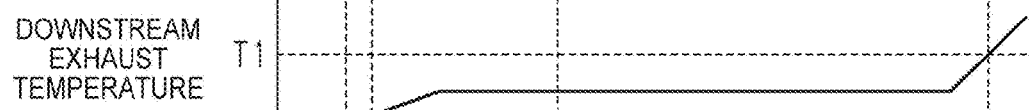
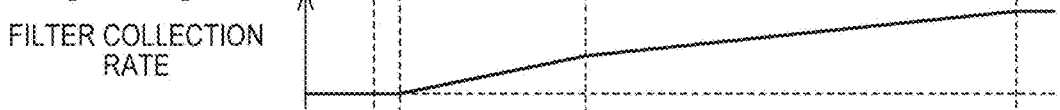
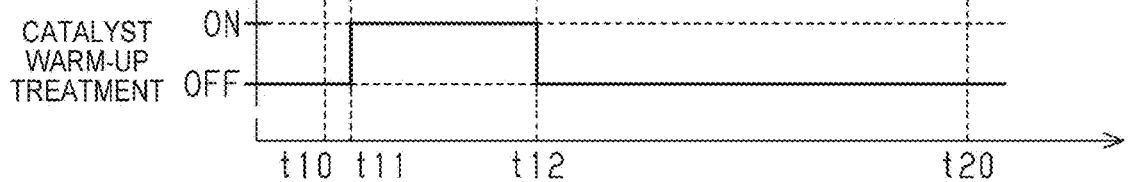

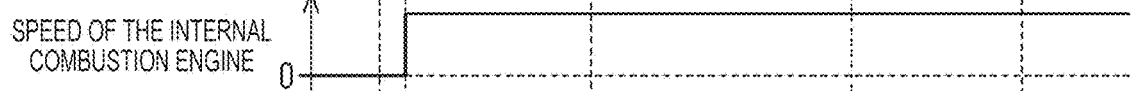
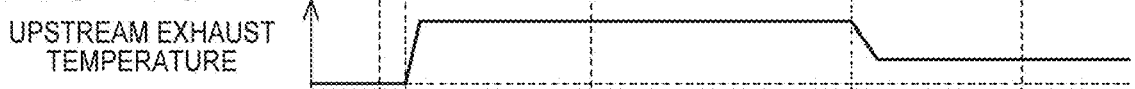
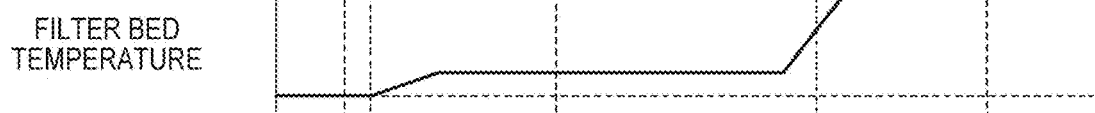
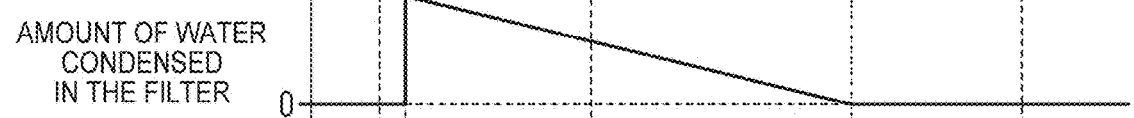
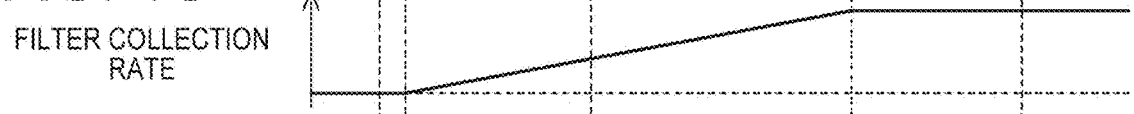
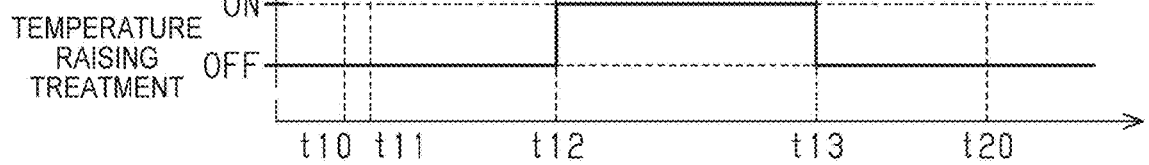

CONTROL DEVICE FOR INTERNAL COMBUSTION ENGINE

CROSS-REFERENCE TO RELATED APPLICATION

This application claims priority to Japanese Patent Application No. 2024-066749 filed on Apr. 17, 2024, incorporated herein by reference in its entirety.

BACKGROUND

1. Technical Field

The present disclosure relates to a control device for an internal combustion engine.

2. Description of Related Art

An internal combustion engine in which a filter is disposed in an exhaust passage is known. Pores that trap particulate matter (PM) are present in a base material of the filter. Exhaust passing through the filter is controlled by the pores trapping PM in the exhaust.

Since moisture is present in the exhaust of the internal combustion engine, condensed water is generated in the exhaust passage by the moisture in the exhaust being condensed. In an example, the condensed water generated by the moisture in the exhaust being condensed may remain in the filter after the internal combustion engine is stopped. If the filter is left in the state where the condensed water adheres thereto, there is a concern that the filter may be damaged due to the condensed water being frozen. An exhaust gas control apparatus described in Japanese Unexamined Patent Application Publication No. 2008-190341 (JP 2008-190341 A) raises a temperature of a filter to a temperature that is higher than a water evaporation temperature to evaporate condensed water adhering to the filter if the temperature of the filter is equal to or less than a predetermined temperature when an internal combustion engine is stopped. Such evaporation of the condensed water at the filter at the time of stopping the internal combustion engine prevents the filter from being damaged due to the condensed water being frozen.

SUMMARY

Even if the condensed water at the filter is evaporated when the internal combustion engine is stopped as in JP 2008-190341 A, there is a concern that condensed water generated by the moisture in the exhaust being condensed may adhere to the filter until the exhaust passage and the filter are sufficiently warmed if the internal combustion engine is restarted. Since it becomes difficult for the pores in the filter to trap PM in the exhaust if the condensed water is adsorbed to the pores, a PM collection effect of the filter is inhibited.

A control device to solve the above problem is a control device for an internal combustion engine that is applied to an internal combustion engine mounted in a vehicle in which a filter that collects PM is disposed in an exhaust passage. The control device for an internal combustion engine executes temperature raising processing of raising an upstream-side exhaust temperature that is a temperature of exhaust on a side further upstream than the filter in the exhaust passage until a state where condensed water at the filter has been vaporized is achieved after the internal combustion engine is started.

According to the above configuration, it is possible to quickly vaporize the condensed water at the filter. It is thus possible to suppress inhibition of a PM collection effect due to adhesion of condensed water to the filter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a timing chart showing a transition of a state at the time of starting an internal combustion engine to which a conventional control device is applied, and showing a transition of a state of an ignition;

FIG. 2B is a timing diagram illustrating a transition of a state at the time of starting an internal combustion engine to which a conventional control device is applied, and illustrating a transition of a rotational speed of an internal combustion engine;

FIG. 2C is a timing diagram showing a state-state transition at the time of starting of an internal combustion engine to which a conventional control device is applied, and showing a transition of an upstream-side exhaust-temperature;

FIG. 2D is a timing diagram showing a transition of a condition at the time of starting of an internal combustion engine to which a conventional control device is applied, and showing a transition of a bed temperature of filters;

FIG. 2E is a timing diagram showing a state-state transition at the time of starting an internal combustion engine to which a conventional control device is applied, and showing a transition of a downstream-side exhaust-temperature;

FIG. 2F is a timing diagram showing a transition of a condition at the time of starting of an internal combustion engine to which a conventional control device is applied, and showing a transition of condensed water content of filters;

FIG. 2G is a timing diagram showing a transition of a condition at the time of starting of an internal combustion engine to which a conventional control device is applied, and showing a transition of a collection rate of filters;

FIG. 2H is a timing chart showing a transition of a state at the time of starting of an internal combustion engine to which a conventional control device is applied, and showing a transition of a state of a catalytic warm-up process;

FIG. 4A is a timing chart showing a state transition at the time of starting an internal combustion engine to which a control device according to a first embodiment is applied, and showing a state transition of an ignition switch;

FIG. 4B is a diagram showing a state-state transition at the time of starting an internal combustion engine to which a control device according to a first embodiment is applied, and showing a transition of a rotational speed of an internal combustion engine;

FIG. 4C is a timing chart showing the transition of the state at the time of starting of an internal combustion engine to which the control device according to the first embodiment is applied, showing the transition of the upstream-side exhaust-temperature;

FIG. 4D is a timing chart showing the transition of the condition at the time of starting of an internal combustion engine to which the control device according to the first embodiment is applied, showing the transition of the bed temperature of the filters;

FIG. 4E is a timing chart showing the transition of the state at the time of starting of an internal combustion engine to which the control device according to the first embodiment is applied, showing the transition of the downstream-side exhaust temperature;

FIG. 4F is a timing chart showing the transition of the condition at the time of starting of an internal combustion engine to which the control device according to the first embodiment is applied, showing the transition of the quantity of condensed water of the filters;

FIG. 4G is a timing chart showing the transition of the condition at the time of starting of an internal combustion engine to which the control device according to the first embodiment is applied, showing the transition of the collection rate of the filters;

FIG. 4H is a timing chart showing a state transition at the time of starting an internal combustion engine to which a control device according to a first embodiment is applied, and showing a state transition of a catalytic warm-up process;

FIG. 4I is a timing chart showing a state transition at the time of starting of an internal combustion engine to which a control device according to a first embodiment is applied, and showing a state transition of a bed temperature treatment;

DETAILED DESCRIPTION OF EMBODIMENTS

First Embodiment

Hereinafter, a first embodiment of a control device for an internal combustion engine will be described referring to FIG. 1 to FIG. 1 to FIG. 4I.

Figure 1:
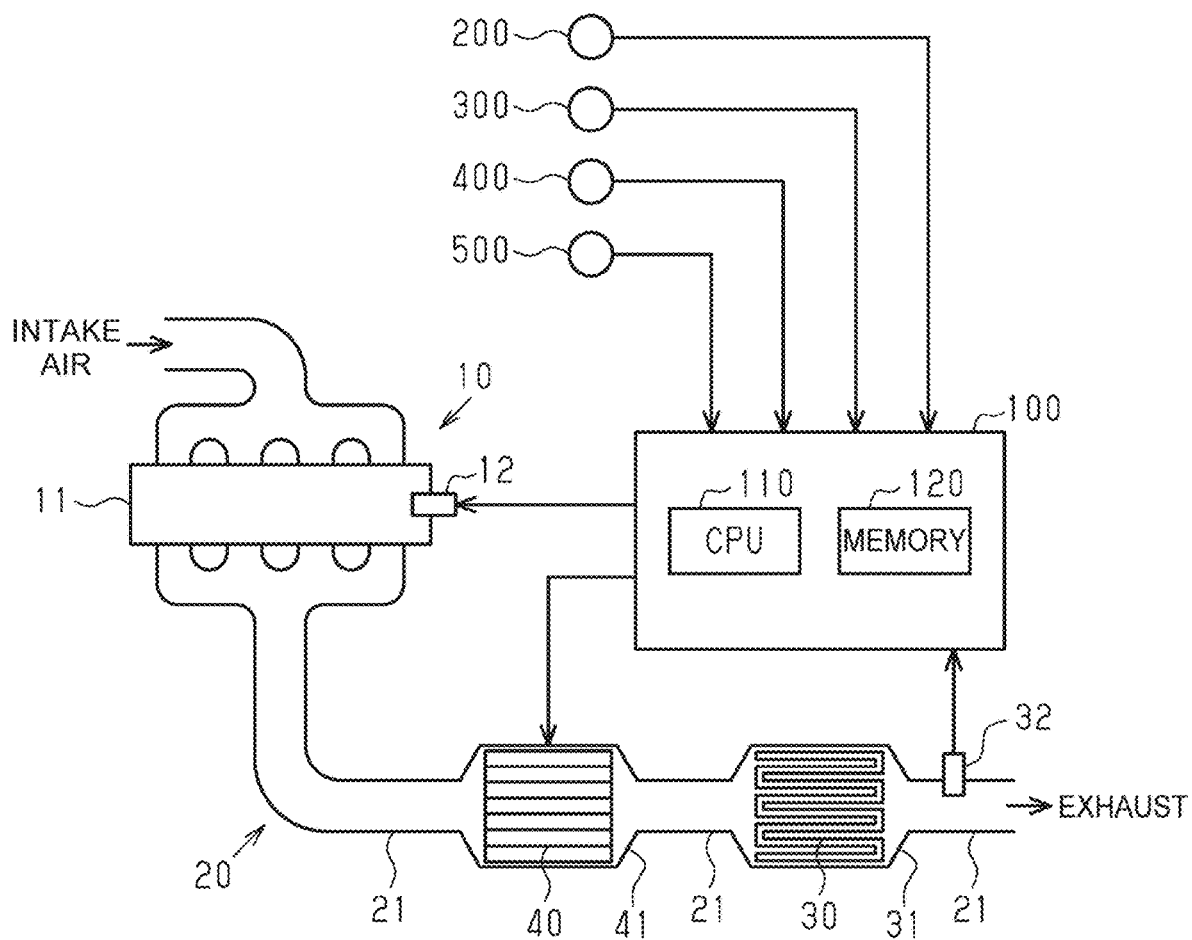
FIG. 1 is a schematic diagram illustrating a control device for an internal combustion engine according to an embodiment and an internal combustion engine to which the control device is applied.

FIG. 1 is a schematic configuration diagram of an internal combustion engine 10 and a control device 100 of the internal combustion engine 10 according to the first embodiment.

The control device 100 is applied to the internal combustion engine 10. The internal combustion engine 10 is mounted on a vehicle in which a filter 30 is disposed in an exhaust passage 20. The internal combustion engine 10 is a spark ignition type gasoline engine. The internal combustion engine 10 includes an engine main body 11 including a plurality of cylinders.

The engine main body 11 generates power for driving the vehicle, for example, by burning the fuel injected from the fuel injection valve 12 inside each cylinder. The fuel injection system is not limited to the in-cylinder direct injection system, and may be a port injection system. In FIG. 1, the description of the cylinder, the intake device, the spark plug, and the like is omitted. The exhaust passage 20 is connected to the engine main body 11 so as to discharge the exhaust gas generated inside the cylinders to the outside air.

The filters 30 collect particulate matter (hereinafter referred to as PM) 10 contained in the exhausted air. The filter 30 is a gasoline particulate filter. The filter 30 is, for example, a wall-flow filter. The filter 30 is held by a filter casing 31 connected to the exhaust pipe 21 of the exhaust passage 20.

An exhaust temperature sensor 32 is provided in the exhaust passage 20. The exhaust temperature sensor 32 acquires the downstream-side exhaust temperature Tout. The downstream exhaust temperature Tout is the temperature of the exhaust gas at the downstream side of the filters 30 in the exhaust passage 20. The exhaust temperature sensor 32 outputs an output signal related to the acquired downstream-side exhaust gas temperature Tout to the control device 100.

The exhaust passage 20 is provided with an electrically heated catalyst (hereinafter referred to as an EHC) 40 for controlling the exhaust gas upstream of the filters 30. EHC 40 generates heat by energization. EHC 40 includes a catalyst housing 41 connected to an exhaust pipe 21 of the exhaust passage 20. EHC 40 catalyst carriers are held in the catalyst housing 41.

Control Device

The control device 100 controls the internal combustion engine 10 by controlling the fuel injection valve 12, the intake device, the spark plug, and the like. The intake device is, for example, a throttle valve. The control device 100 includes a CPU 110 that executes various processes in accordance with programs. The control device 100 includes a memory 120 in which programs and the like for CPU 110 to execute various processes are stored. The control device 100 acquires information on the internal combustion 30 engine 10, such as the number of revolutions and the load factor, from the internal combustion engine 10. The rotational speed is the rotational speed per unit time of the output shaft of the internal combustion engine 10.

The control device 100 receives output signals from sensors such as the ignition sensor 200, the water temperature sensor 300, A/F sensor 400, and the outside air temperature sensor 500. The ignition sensor 200 acquires an operation related to turning on/off of an ignition switch (hereinafter referred to as an IGSW) of a vehicle in which the internal combustion engine 10 is mounted. The water temperature sensor 300 acquires the coolant temperature of the internal combustion engine 10. A/F sensor 400 acquires an air-fuel ratio of the internal combustion engine 10. The outside air temperature sensor 500 acquires the outside air temperature.

The control device 100 executes a catalytic warm-up process for promoting warm-up of EHC 40 at the time of cold start of the internal combustion engine 10 or the like. The cold start is a start from a state in which the internal combustion engine 10 is cooled to a temperature equivalent to the outside air temperature. The control device 100 determines whether EHC 40 is not warmed based on the coolant temperature or the like of the internal combustion engine 10. Then, the control device 100 executes the catalytic warm-up process when it is determined that EHC 40 is not warmed up. By executing the catalyst warm-up process, exhaust emission at the time of starting and immediately after starting the internal combustion engine 10 can be reduced.

The catalyst warm-up process is performed by at least one of the first warm-up method and the second warm-up method. The first warm-up method is a method of raising the temperature of the exhaust gas flowing into EHC 40. In the first warm-up method, the control device 100 performs an ignition retardation that sets the ignition timing of the internal combustion engine 10 to a timing later than normal. When the warm-up of EHC 40 is completed, the control device 100 terminates the catalytic warm-up process by stopping the ignition retard angle. The second warm-up method is a method of applying a voltage to EHC 40. In the second warm-up mode, the control device 100 generates heat of EHC 40 by applying a voltage to EHC 40.

Starting a Conventional Internal Combustion Engine

Referring to FIG. 2A to FIG. 2H, the transition of the state at the time of starting the internal combustion engine 10 in the conventional control will be described. As shown in FIG. 2A, when IGSW is turned on at the time t10, the internal combustion engine 10 starts driving at the time t11. As the internal combustion engine 10 starts, as shown in FIG. 2B, the rotational speed of the internal combustion engine 10 increases. In this case, as shown in FIG. 2H, the catalytic warm-up process is started from the time t11. Thereafter, the catalytic warm-up process is continued until a time t12 at which the warm-up of EHC 40 is completed. The time t12 is a time at which EHC 40 is sufficiently heated.

During the period from the time t11 to the time t12, the catalyst warm-up process is executed, so that the upstream side exhaust temperature Tin, which is the temperature of the exhaust gas at the upstream side of the filters 30 in the exhaust passage 20, rises as shown in FIG. 2C. For example, the upstream side exhaust temperature Tin is the temperature of the exhaust gas between EHC 40 and the filters 30 in the exhaust passage 20. As a result of the rise in the temperature of the exhaust gas flowing into the filter 30, the bed temperature Tf of the filter 30 also rises, as shown in FIG. 2D. As the bed temperature Tf of the filters 30 increases, the downstream-side exhaust temperature Tout also increases, as shown in FIG. 2E.

Here, as shown in FIG. 2D, the rise in the bed temperature Tf of the filters 30 stagnates at the dew point. This is because the thermal energy of the exhaust is used to vaporize the condensed water of the filter 30. The condensed water of the filter 30 is generated by condensation of moisture in the exhaust gas of the internal combustion engine 10 after the start of the internal combustion engine 10. The condensed water of the filter 30 includes at least one of water flowing into the filter 30 after the moisture in the exhaust gas condenses in the exhaust pipe 21, and water generated by the moisture in the exhaust gas condensing in the filter 30. Until the condensed water of the filter 30 is vaporized, the bed temperature Tf of the filter 30 stagnates at the dew point.

Since the bed temperature Tf of the filter 30 is lowest when the internal combustion engine 10 is started, the condensed water amount Mw generated in the filter 30 after the start of the internal combustion engine 10 varies depending on the bed temperature Tf of the filter 30 when the internal combustion engine 10 is started. The condensate generated in the filters 30 at the start-up of the internal combustion engine 10 is reduced over time, as shown in FIG. 2F.

When the catalytic warm-up process ends at the time t12, the upstream side exhaust temperature Tin decreases as shown in FIG. 2C. When the catalyst warm-up process is completed while the condensed water remains in the filter 30, the upstream side exhaust temperature Tin decreases with the completion of the catalyst warm-up process, and therefore, as shown in FIG. 2F, the rate of reduction of the condensed water in the filter 30 per unit time is reduced. The time t20 is a time at which the downstream-side exhaust temperature Tout reaches the first temperature T1, as shown in FIG. 2E. The first temperature T1 is a temperature greater than the dew point. In this instance, the condensed water of the filters 30 is all vaporized at time t20.

Incidentally, when water adheres to the filter 30, water enters the pores trapping PM, thereby reducing the collection rate of the filter 30. Therefore, when the condensed water adheres to the filter 30 at the start of the internal combustion engine 10, PM collecting action originally provided in the filter 30 is inhibited from being exerted. As shown in FIG. 2G, when the condensed water adheres to the filter 30, the collection rate of the filter 30 increases as the condensed water decreases. When the catalytic warm-up process is terminated while the condensed water remains in the filter 30, the upstream side exhaust temperature Tin is lowered, and therefore, all of the condensed water in the filter 30 is delayed from being vaporized. Consequently, there is a possibility that PM collecting action of the filters 30 is inhibited when the internal combustion engine 10 is started.

Temperature Raising Process

The control device 100 executes a temperature raising process after the internal combustion engine 10 is started. The temperature raising process is a process of raising the upstream side exhaust temperature Tin until the condensed water of the filters 30 reaches the vaporized condition. The control device 100 executes the temperature raising process following the execution of the catalyst warm-up process. More specifically, by executing the temperature raising process, the upstream side exhaust temperature Tin equivalent to that during the catalyst warm-up process is maintained after the catalyst warm-up process is executed. Note that the "state in which the condensed water of the filter 30 is vaporized" may be a state in which all the condensed water of the filter 30 is vaporized, or may be a state in which the condensed water remains in the filter 30 to such an extent that the condensed water is vaporized immediately after the completion of the temperature raising process.

The control device 100 acquires the downstream-side exhaust temperature Tout from the exhaust temperature sensor 32. The control device 100 executes the temperature raising process until the downstream-side exhaust temperature Tout becomes equal to or higher than the first temperature T1 indicating that the condensed water of the filters 30 is vaporized. As described above, the first temperature T1 is a temperature greater than the dew point. The first temperature T1 may be a dew point. The first temperature T1 is set to a temperature at which it can be determined that the bed temperature Tf of the filter 30 is a predetermined temperature according to the properties of the filter 30. The predetermined temperature is, for example, 100° C. at which the condensed water is vaporized.

The control device 100 executes the temperature raising process by at least one of the first temperature raising method and the second temperature raising method. The first temperature raising method is a method of raising the temperature of the exhaust gas flowing out of the internal combustion engine 10. In the first temperature raising method, the control device 100 raises the upstream side exhaust temperature Tin by performing the ignition retardation. The second temperature raising method is a method of applying a voltage to EHC 40. In the second temperature raising process, the control device 100 generates heat of EHC 40 by applying a voltage to EHC 40. As EHC 40 generates heat, the temperature of the exhaust gas flowing out of EHC 40 rises, so that the upstream side exhaust temperature Tin rises. By the temperature raising process, the upstream side exhaust temperature Tin equivalent to that during the catalytic warm-up process is maintained.

Temperature Raising Process Flow

Figure 3:
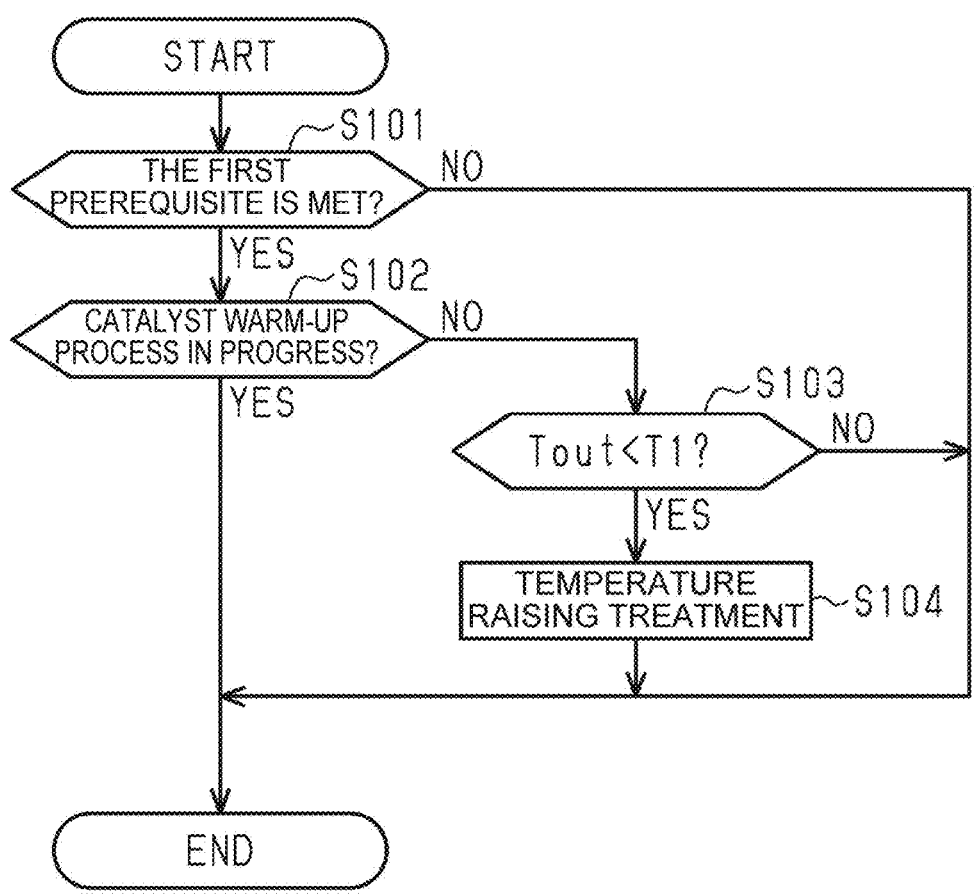
FIG. 3 is a flowchart illustrating a flow of processing executed in the control device according to the first embodiment.

FIG. 3 shows a flow of a series of processes related to the temperature raising process performed in the first embodiment. The control device 100 repeatedly executes the processing of FIG. 3 during the operation of the internal combustion engine 10.

The control device 100 determines whether or not the first precondition is satisfied (S101). In the first precondition, a predetermined condition is set. Examples of the first precondition include the following.

There should be no abnormality in the sensors required for the temperature raising process.

The filter 30 needs to be heated.

As a state in which the temperature raising process is not required for the filter 30, for example, there is a state in which condensed water is less likely to be generated in the filter 30 such as a state in which the outside air temperature is sufficiently high and a bed temperature Tf of the filter 30 is sufficiently high.

When the first prerequisite is not satisfied (S101: NO), the control device 100 ends the process of FIG. 3. When the first prerequisite is satisfied (S101: YES), the control device 100 determines whether or not the catalytic warm-up process is being executed (S102). Information for determining whether the catalyst warm-up process is being executed is stored in the memory 120 of the control device 100, for example. When the catalytic warm-up process is being executed (S102: YES), the control device 100 ends the process of FIG. 3.

If the catalytic warm-up process is not being executed (S102: NO), the control device 100 determines whether the downstream-side exhaust temperature Tout is lower than the first temperature T1 (S103). When the downstream-side exhaust temperature Tout is lower than the first temperature T1 (S103: YES), the control device 100 executes a temperature raising process (S104). In this way, the control device 100 ends the process of FIG. 3 once the temperature raising process is started. When the downstream-side exhaust temperature Tout is equal to or higher than the first temperature T1 (S103: NO), the control device 100 ends the process of FIG. 3. Thus, the control device 100 repeatedly executes the series of processes of FIG. 3 while the internal combustion engine 10 is in operation, and continues the temperature raising process until the downstream-side exhaust temperature Tout becomes equal to or higher than the first temperature T1 (S103: NO).

Starting the Internal Combustion Engine When Executing the Temperature Raising Process Referring to FIG. 4A to FIG. 4I, the transition of the condition at the time of starting the internal combustion engine 10 when the temperature raising process is executed will be described. Note that the transition of the state up to the time t12 is the same as the transition of the state in FIG. 2A to FIG. 2H, and therefore, the same explanation will be omitted.

As shown in FIG. 4I, the control device 100 executes the temperature raising process from the time t12. By the temperature raising process, the upstream side exhaust temperature Tin after the time t12 is maintained at the same temperature as that during the catalytic warm-up process. Therefore, as compared with FIG. 2A to FIG. 2H, as shown in FIG. 4F, the reduction rate per unit time of the condensed water of the filters 30 after the time t12 is maintained at the same level as that during the catalytic warm-up process. The time t13 is a time at which the downstream-side exhaust-gas temperature Tout reaches the first temperature T1. As shown in FIG. 4F, the condensed water of the filters 30 is all vaporized at a time t13 earlier than the time t20. By vaporizing the condensed water of the filter 30 early in this way, as shown in FIG. 4G, it is possible to shorten the period in which PM collecting action of the filter 30 due to the attachment of the condensed water is inhibited. Therefore, it is possible to reduce the amount of PM discharged during traveling of the vehicles equipped with the internal combustion engine 10.

Operation and Effect of the First Embodiment (1-1) According to the control device 100 described above, after the internal combustion engine 10 is started, the temperature raising process is executed until the condensed water of the filter 30 reaches the vaporized state. Therefore, the condensed water of the filter 30 can be rapidly vaporized. Therefore, it is possible to suppress the inhibition of PM collecting action due to the adhesion of the condensed water to the filters 30.

(1-2) The control device 100 acquires the downstream-side exhaust temperature Tout from the exhaust temperature sensor 32. Since it can be determined that the moisture of the filter 30 is vaporized based on the downstream exhaust temperature Tout, it can be determined that the condensed water of the filter 30 has reached the vaporized condition from the downstream exhaust temperature Tout.

Second Embodiment

A second embodiment of a control device for an internal combustion engine will be described with reference to FIGS. 1 and 5. In the second embodiment, a part of the temperature raising process is different from the first embodiment. In the following description, portions different from those of the first embodiment will be mainly described, and the same components as those of the first embodiment will be denoted by the same reference numerals, and redundant description will be omitted.

The control device 100 of the second embodiment executes the temperature raising process until the input energy amount Eact reaches the target energy amount Etag. The input energy amount Eact is the total amount of energy input to the filters 30 after the start of the internal combustion engine 10. The target energy amount Etag is an amount of energy required to vaporize the condensed water estimated to be generated in the filters 30. The control device 100 continues to execute the temperature raising process until the input energy amount Eact reaches the target energy amount Etag after executing the catalytic warm-up process. More specifically, by executing the temperature raising process, the upstream side exhaust temperature Tin equivalent to the exhaust temperature during the catalyst warming-up process is maintained until the input energy amount Eact reaches the target energy amount Etag after the catalyst warming-up process is executed.

The control device 100 calculates the condensed water amount Mw in the filters 30, and calculates the target energy amount Etag from the condensed water amount Mw. The condensed water amount Mw generated in the filter 30 is calculated from the bed temperature Tf of the filter 30. The control device 100 stores first map information regarding a relation between the bed temperature Tf of the filter 30 at the time of starting the internal combustion engine 10 and the condensed water amount Mw of the filter 30. The control device 100 calculates the condensed water amount Mw of the filter 30 based on the first map data from the bed temperature Tf of the filter 30 at the time of starting the internal combustion engine 10.

Here, the bed temperature Tf of the filter 30 is obtained by multiplying a value obtained by subtracting the current outside air temperature from the bed temperature Tf of the filter 30 at the time of stopping the previous internal combustion engine 10 by a correction factor relating to the soak time, and adding the value to the current outside air temperature. The correction coefficient is a coefficient of 1 or less, which decreases as the soak time increases. The bed temperature Tf becomes equal to the outside air temperature when the internal combustion engine 10 continues to be stopped. Therefore, the correction coefficient is 0 when the soak time is equal to or longer than the predetermined time.

The condensed water amount Mw of the filter 30 is calculated by multiplying the difference between the absolute humidity of the temperature of the exhaust gas at the start of the internal combustion engine 10 and the absolute humidity of the bed temperature Tf of the filter 30 by the surface area of the base material of the filter 30 and further multiplying by a predetermined corrective factor. The absolute humidity of the temperature of the exhaust gas and the absolute humidity of the bed temperature Tf of the filter 30 can be calculated from the outside air temperature, the air-fuel ratio, the properties of the fuel, the bed temperature Tf of the filter 30, and the like. In the calculation of the actual condensed water amount Mw, since the bed temperature Tf of the filter 30 at the time of starting the internal combustion engine 10 becomes dominant, the calculation process can be simplified by storing the relation between the bed temperature Tf of the filter 30 and the condensed water amount Mw as the first map data in advance.

The control device 100 stores second map information regarding a relation between the condensed water amount Mw and the amount of energy required to vaporize all of the condensed water amount Mw. The second map information is set based on the size of the base material of the filter 30, characteristics of the internal combustion engine 10, and the like. The control device 100 calculates the target energy amount Etag based on the second map information from the condensed water amount Mw in the filters 30. The control device 100 may store third map information regarding the relation between the bed temperature Tf of the filter 30 at the time of starting the internal combustion engine 10 and the amount of energy required to vaporize all the condensed water amount Mw generated in the bed temperature Tf of the filter 30. The third map information is map information obtained by combining the first map information and the second map information.

When the temperature raising process is executed by the first temperature raising process, the input-energy amount Eact is calculated based on the retardation amount of the ignition timing in the internal combustion engine 10. When the temperature raising process is executed by the first temperature raising process, the input energy amount Eact may be calculated from the exhaust amount of the internal combustion engine 10 or the like. When the temperature raising process is executed by the second temperature raising process, the input energy amount Eact is calculated based on the power consumed by EHC 40. The power dissipation of EHC 40 is calculated based on the applied voltage to EHC 40.

Figure 5:
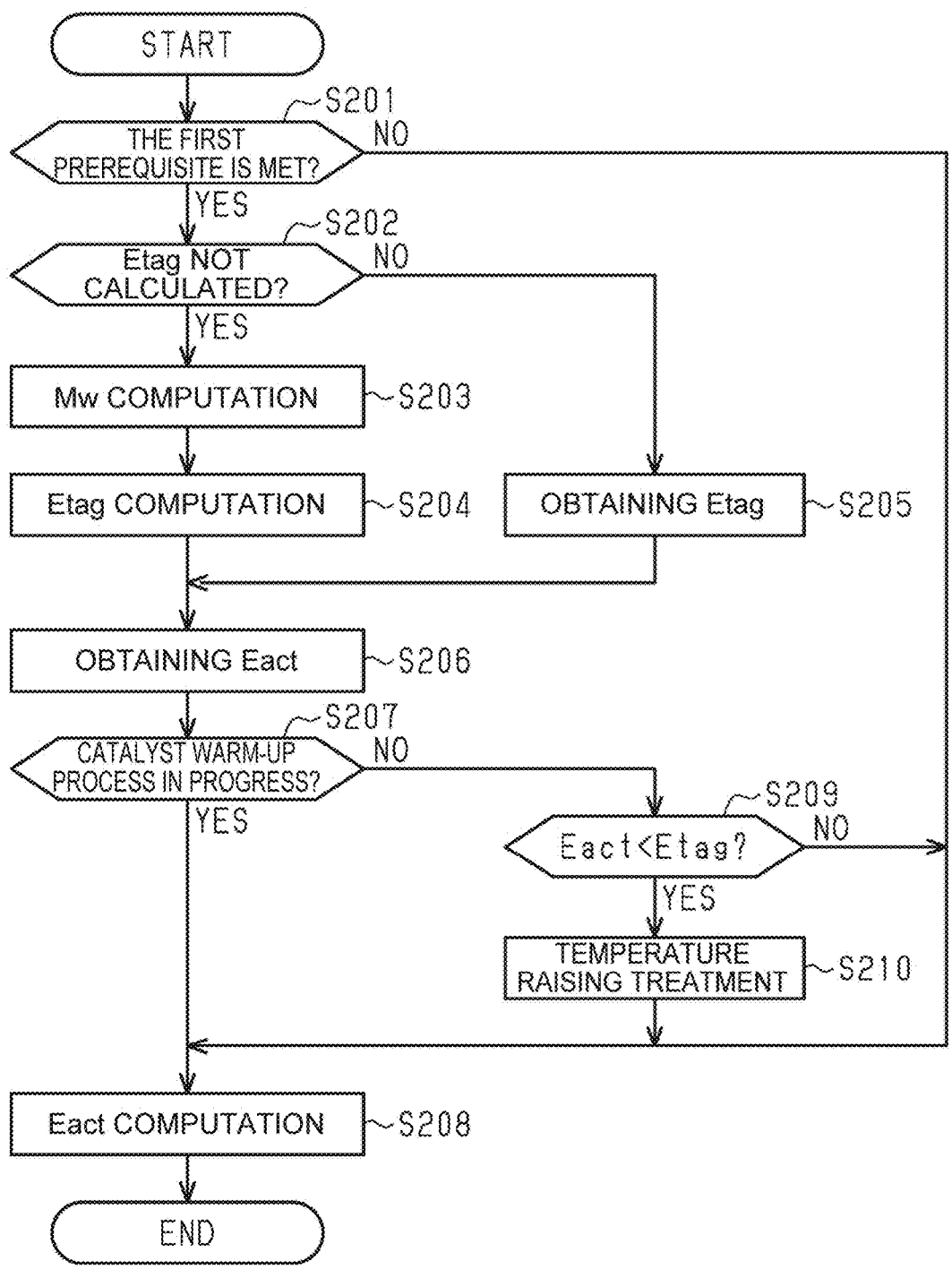
FIG. 5 is a flow chart showing a flow of a process executed in the control device according to the second embodiment.

FIG. 5 shows a flow of a series of processes related to the temperature raising process performed in the second embodiment. The control device 100 repeatedly executes the processing of FIG. 5 during the operation of the internal combustion engine 10. The control device 100 determines whether or not the first precondition is satisfied (S201). The contents of the first prerequisite are the same as those of the first embodiment. When the first precondition is not satisfied (S201: NO), the control device 100 calculates the input energy amount Eact as described above (S208), and ends the process of FIG. 5 once. When the first precondition is satisfied (S201: YES), the control device 100 determines whether or not the target energy-quantity Etag is not calculated (S202).

If the target energy amount Etag is not calculated (S202: YES), the control device 100 calculates the condensed water amount Mw generated in the filters 30 (S203). The control device 100 calculates the condensed water amount Mw based on the first map data from the bed temperature Tf of the filters 30. The control device 100 calculates the target energy amount Etag from the condensed water amount Mw (S204). The control device 100 calculates the target energy amount Etag based on the second map information from the condensed water amount Mw calculated in S203. The calculated target energy quantity Etag is stored in the memories 120 of the control device 100. When the target energy amount Etag is not yet calculated (S202: NO), the control device 100 acquires the target energy amount Etag (S205).

The control device 100 acquires the input energy amount Eact (S206). The input energy amount Eact is stored in the memory 120 of the control device 100 so as to be capable of being updated sequentially, for example. The input energy amount Eact is set to zero at the first time of the process of FIG. 5 at the start of the internal combustion engine 10. The control device 100 determines whether or not the catalytic warm-up process is being executed (S207). When the catalytic warm-up process is being executed (S207: YES), the control device 100 calculates the input energy amount Eact (S208), and ends the process of FIG. 5 once.

If the catalytic warm-up process is not being executed (S207: NO), the control device 100 determines whether or not the input energy amount Eact is smaller than the target energy amount Etag (S209). When the input energy amount Eact is smaller than the target energy amount Etag (S209: YES), the control device 100 executes a temperature raising process (S210). In this way, when the temperature raising process is started, the control device 100 calculates the input energy amount Eact (S208), and ends the process of FIG. 5 once. control device 100, when the input energy amount Eact is equal to or greater than the target energy amount Etag (S209: NO), the control device 100 calculates the input energy amount Eact (S208), the process of FIG. 5 once ends.

Operation and Effect of the Second Embodiment (2) The temperature of the filter 30 is increased by the energy supplied to the filter 30 after the start of the internal combustion engine 10. The input energy amount Eact to be input to the filters 30 after the start of the internal combustion engine 10 can be calculated from the retardation amount of the ignition timing in the internal combustion engine 10, the applied voltage to EHC 40, and the like. According to the control device 100 described above, the temperature raising process is executed until the input energy amount Eact supplied to the filters 30 after the start of the internal combustion engine 10 reaches the target energy amount Etag required for vaporizing the condensed water. Since the temperature raising process is executed based on the input energy amount Eact and the target energy amount Etag, the exhaust gas temperature on the exhaust passage 20 is not required to be acquired, so that the configuration of the internal combustion engine 10 can be simplified.

Third Embodiment

A third embodiment of a control device for an internal combustion engine will be described with reference to FIGS. 1 and 6. In the third embodiment, the conditions under which the temperature raising process is executed are different from those in the first embodiment. In the following description, portions different from those of the first embodiment will be mainly described, and the same components as those of the first embodiment will be denoted by the same reference numerals, and redundant description will be omitted.

The control device 100 does not need to execute the temperature raising process under a predetermined condition. By not executing the temperature raising process under a predetermined condition, it is possible to suppress the fuel consumption or the electric power consumption related to the temperature raising process. The predetermined conditions include a first condition and a second condition.

The first condition includes a condition related to PM deposit Ms indicating the quantity of PM deposited on the filters 30. The control device 100 calculates the quantity of PM accumulated in the filter 30 per unit time based on the rotational speed, the load factor, the bed temperature Tf of the filter 30, and the like of the internal combustion engine 10. Then, the control device 100 calculates PM accumulation amount Ms by integrating the amount of PM accumulated in the filters 30 per unit-time. As another example, the control device 100 may calculate the deposition amount based on the difference between the pressure on the upstream side and the pressure on the downstream side of the filter 30 in the exhaust passage 20 and the intake air amount. Specifically, PM deposition amount Ms is calculated to be larger as the pressure difference is larger, and PM deposition amount Ms is calculated to be larger as the intake air amount is smaller.

When PM deposit Ms of the filters 30 is equal to or greater than the threshold Mthr at the time of starting the internal combustion engine 10, the control device 100 does not execute the temperature raising process. When PM deposit Ms is increased, the pores of the filter 30 are filled with PM, and even if the condensed water adheres to the filter 30, the condensed water cannot enter the pores of the filter 30. As described above, when PM deposit Ms is increased, a decrease in the collection rate of the filters 30 due to the adhesion of the condensed water is less likely to occur. The threshold-value Mthr is set to be able to determine that a decrease in the collection rate of the filter 30 due to the adhesion of the condensed water does not occur, or that a decrease in the collection rate of the filter 30 due to the adhesion of the condensed water can be ignored. The thresholds Mthr are set according to the shapes, types, and the like of the base materials of the filters 30.

The second condition includes a condition related to the bed temperature Tf of the filters 30 at the time of starting the internal combustion engine 10. When the bed temperature Tf of the filter 30 is equal to or higher than the second temperature T2 indicating that the condensed water of the filter 30 has vaporized at the start of the internal combustion engine 10, the control device 100 does not execute the temperature raising process. The second temperature T2 is a dew point. The second temperature T2 may be at a temperature greater than the dew point. The control device 100 calculates the bed temperature Tf of the present filters 30. The bed temperature Tf of the filters 30 is calculated by the computational methods illustrated in the second embodiment.

When the bed temperature Tf of the filter 30 is larger than the second temperature T2 at the time of starting the internal combustion engine 10, the filter 30 is sufficiently warmed, so that the condensed water is less likely to be generated in the filter 30. When the bed temperature Tf of the filters 30 is larger than the second temperature T2 at the time of starting the internal combustion engine 10, the internal combustion engine 10 is intermittently operated, the internal combustion engine 10 is short, and the like are exemplified.

Figure 6:
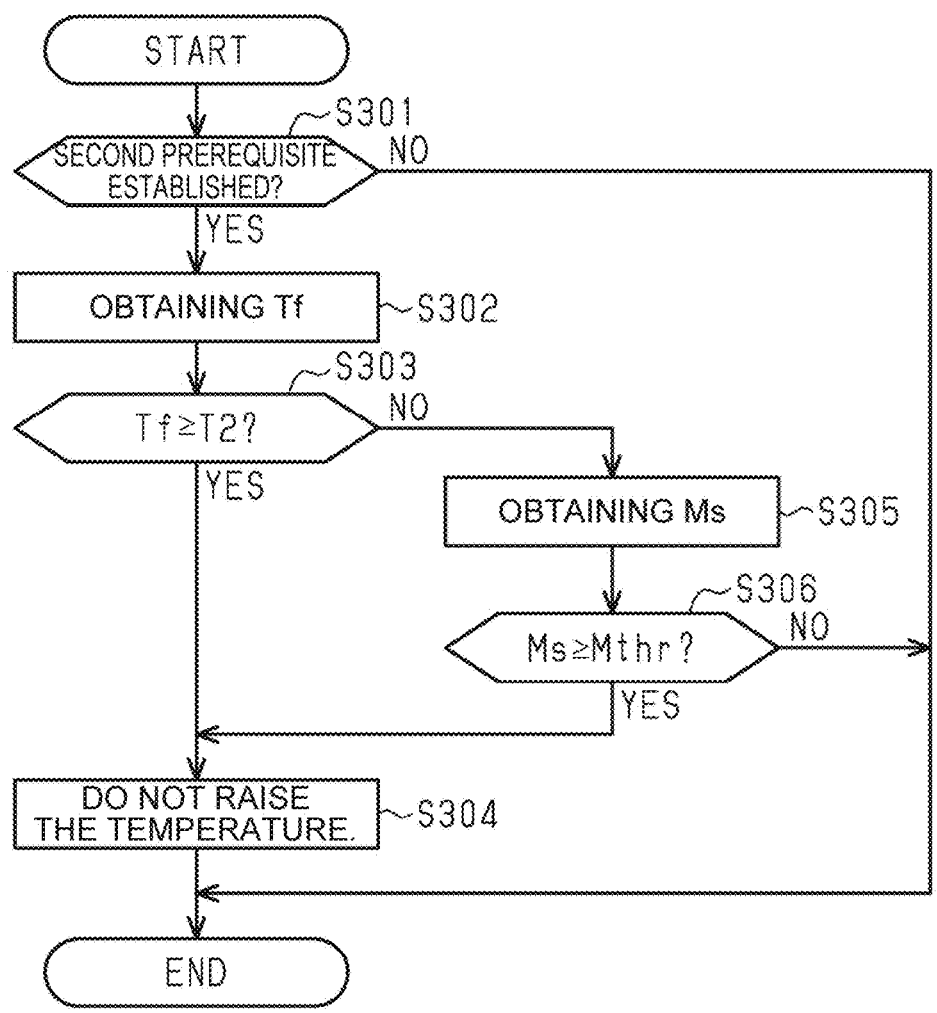
FIG. 6 is a flowchart illustrating a flow of processing executed in the control device according to the third embodiment.

FIG. 6 shows a flow of a series of processes for determining whether or not the temperature raising process needs to be executed. As in the first embodiment, the control device 100 repeatedly executes a series of processes described with reference to FIG. 3 during operation of the internal combustion engine 10. Alternatively, as in the second embodiment, the control device 100 repeatedly executes a series of processes described with reference to FIG. 5 during operation of the internal combustion engine 10. The control device 100 executes the process of FIG. 6 when the internal combustion engine 10 is started.

The control device 100 determines whether or not the second prerequisite is satisfied (S301). In the second prerequisite, a predetermined condition is set. Examples of the second precondition include the following.

There should be no abnormality in the sensors required for the temperature raising process.

The control device 100 acquires the bed temperature Tf of the filters 30 (S302). The control device 100 obtains the bed temperature Tf by calculating the bed temperature Tf based on the values of the various sensors. The control device 100 may acquire the bed temperature Tf stored in the memories 120 of the control device 100 for processing other than the temperature raising processing. When the bed temperature Tf is equal to or higher than the second temperature T2 (S303: YES), the control device 100 prohibits the temperature raising process (S304), and ends the process of FIG. 6. When the bed temperature Tf is equal to or higher than the second temperature T2, the temperature raising process is prohibited, and therefore the temperature raising process is not executed. Even if the process proceeds to the process (S104) of executing the temperature raising process through the series of processes described with respect to FIG. 3, the control device 100 does not execute the temperature raising process. Alternatively, the control device 100 does not execute the temperature raising process even if the process proceeds to the process (S210) of executing the temperature raising process through the series of processes described with respect to FIG. 5.

When the bed temperature Tf of the filter 30 is not equal to or higher than the second temperature T2 (S303: NO), the control device 100 acquires PM deposit Ms of the filter 30 (S305). PM deposit Ms is stored, for example, in the memories 120 of the control device 100. When PM deposit Ms is equal to or larger than the threshold Mthr (S306: YES), the control device 100 prohibits the temperature raising process (S304), and ends the process of FIG. 6. If PM deposit Ms is greater than or equal to the threshold Mthr, the temperature raising process is prohibited. Therefore, the temperature raising process is not executed even in this case.

When PM deposit Ms is not equal to or larger than the threshold Mthr (S306: NO), the control device 100 ends the process of FIG. 6.

Operation and Effect of the Third Embodiment (3-1) PM collected from the exhaust gas is accumulated in the filters 30 on the exhaust passage 20. When PM is deposited on the filter 30, the pores of the filter 30 are filled with PM. When the pores are filled, PM collecting action is hardly inhibited due to adsorption of the condensed water to the pores. Since the control device 100 does not execute the temperature raising process when PM deposit Ms of the filters 30 is equal to or larger than the threshold Mthr, it is possible to avoid the execution of the unnecessary temperature raising process.

(3-2) When the bed temperature Tf of the filter 30 is equal to or higher than the temperature indicating that the condensed water of the filter 30 has vaporized at the start of the internal combustion engine 10, the moisture in the exhaust gas in the filter 30 is less likely to condense. That is, the condensed water is less likely to adhere to the filter 30. The control device 100 prohibits the execution of the temperature raising process when the bed temperature Tf of the filter 30 is equal to or higher than the second temperature T2 indicating that the condensed water of the filter 30 has vaporized, so that the execution of the unnecessary temperature raising process can be avoided.

Example of Change

Each of the above-described embodiments can be modified as follows. Each of the embodiments and modifications described below may be combined with each other and carried out unless there is any technical inconsistency.

Alcohol fuel may be used as the fuel for the period of the internal combustion engine 10. In this modification, in the calculation of the target energy amount Etag in the second embodiment, the condensed water amount Mw of the filters 30 may be calculated based on the alcohol concentration of the alcohol fuel.

The temperature raising process may be executed in an internal combustion engine that does not have a catalyst warm-up function.

EHC 40 may be omitted from the exhaust passage 20.

Instead of EHC 40, an exhaust control catalyst that does not have a function of generating heat by energization may be disposed in the exhaust passage 20.

The temperature raising process may be executed even when the catalyst warm-up process is not executed. In the present modification, in the series of processes illustrated in FIG. 3, if the first precondition is satisfied (S101: YES), the process proceeds to S103 process.

The filters 30 may be provided with temperature sensors for acquiring bed temperature Tf. The control device 100 may acquire the bed temperature Tf of the filters 30 from the temperature sensor that acquires the bed temperature Tf.

In a case where the first condition is satisfied, the control device 100 may adopt a mode in which the temperature raising process is prohibited even if the second condition is not satisfied. That is, in this case, when PM deposit Ms of the filter 30 is equal to or larger than the threshold Mthr at the time of starting the internal combustion engine 10, the control device 100 does not execute the temperature raising process regardless of the bed temperature Tf of the filter 30. For example, the control device 100 may omit the determination regarding the second condition. The control device 100 may prohibit the temperature raising process when any one of the first condition and the second condition is satisfied.

The control device 100 may adopt a mode in which the determination of the first condition is omitted and the temperature raising process is prohibited when the second condition is satisfied.

What is claimed is:

1. A control device for an internal combustion engine mounted in a vehicle including a filter that collects particulate matter (PM) disposed in an exhaust passage, the control device comprising a processor and a memory storing instructions that, in a case executed by the processor, cause the control device to execute temperature raising processing of raising an upstream-side exhaust temperature that is a temperature of exhaust on a side further upstream than the filter in the exhaust passage until a state where condensed water at the filter has been vaporized is achieved after the internal combustion engine is started, wherein, in a case where an amount of accumulated PM in the filter is equal to or greater than a threshold value at a time that the internal combustion engine is started, the control device does not execute the temperature raising processing.

2. The control device according to claim 1, wherein the control device is configured to acquire, from an exhaust temperature sensor that acquires a downstream-side exhaust temperature that is a temperature of exhaust on a side further downstream than the filter in the exhaust passage, the downstream-side exhaust temperature, and execute the temperature raising processing until the downstream-side exhaust temperature becomes equal to or greater than a first temperature that indicates that the condensed water of the filter is being vaporized.

3. The control device according to claim 1, wherein the control device is configured to execute the temperature raising processing until an amount of input energy that is input to the filter after the internal combustion engine is started reaches a target amount of energy necessary to vaporize condensed water that is estimated to be generated in the filter.

4. The control device according to claim 1, wherein in a case where a bed temperature of the filter is equal to or greater than a second temperature that indicates that the condensed water at the filter has been vaporized when the internal combustion engine is started, the control device does not execute the temperature raising processing.

* * * * *